(12) United States Patent
McCarthy, Jr. et al.

(10) Patent No.: US 10,626,758 B2
(45) Date of Patent: Apr. 21, 2020

(54) ROCKER ARM ASSEMBLY

(71) Applicant: Eaton Corporation, Cleveland, OH (US)

(72) Inventors: James E. McCarthy, Jr., Kalamazoo, MI (US); Douglas J. Nielsen, Marshall, MI (US); Kshamta Bishnoi, Pune (IN)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 16/130,496

(22) Filed: Sep. 13, 2018

(65) Prior Publication Data
US 2019/0010835 A1    Jan. 10, 2019

Related U.S. Application Data

(63) Continuation of application No. PCT/US2016/069452, filed on Dec. 30, 2016.

(30) Foreign Application Priority Data

Mar. 16, 2016 (IN) .............................. 201611009132
Apr. 28, 2016 (IN) .............................. 201611014772

(51) Int. Cl.
| | |
|---|---|
| *F01L 1/18* | (2006.01) |
| *F01L 1/24* | (2006.01) |
| *F01L 1/26* | (2006.01) |
| *F01L 13/06* | (2006.01) |
| *F16K 15/04* | (2006.01) |
| *F16K 15/18* | (2006.01) |
| *F01L 1/053* | (2006.01) |

(52) U.S. Cl.
CPC .............. *F01L 1/181* (2013.01); *F01L 1/2416* (2013.01); *F01L 1/267* (2013.01); *F01L 13/06* (2013.01);
(Continued)

(58) Field of Classification Search
CPC ......... F01L 1/181; F01L 1/2416; F01L 1/267; F01L 13/065; F01L 2001/0535;
(Continued)

(56) References Cited

U.S. PATENT DOCUMENTS 5,353,756 A * 10/1994 Murata ................. F01L 1/2416
                                                                  123/90.16
5,495,838 A *  3/1996 Johnson, Jr. ............ F01L 13/06
                                                                  123/322
(Continued)

OTHER PUBLICATIONS

International Search Report and Written Opinion for International Application No. PCT/US2016/069452 dated Apr. 24, 2017, 17 pages.

*Primary Examiner* — Phutthiwat Wongwian
*Assistant Examiner* — Susan E Scharpf
(74) *Attorney, Agent, or Firm* — RMCK Law Group PLC

(57) ABSTRACT

A combined exhaust and engine brake rocker arm assembly configured to selectively open first and second exhaust valves, includes a rocker arm body, an exhaust rocker arm assembly formed in the rocker arm body, and an engine brake rocker arm assembly formed in the rocker arm body and configured to operate in a collapse mode and a rigid mode. The exhaust rocker arm assembly is configured to selectively engage a valve bridge to open the first and second exhaust valves, and the engine brake rocker arm assembly is configured to selectively engage the valve bridge to open only the first exhaust valve.

17 Claims, 8 Drawing Sheets

(52) U.S. Cl.
CPC .......... *F01L 13/065* (2013.01); *F16K 15/044* (2013.01); *F16K 15/183* (2013.01); *F01L 1/24* (2013.01); *F01L 1/2405* (2013.01); *F01L 1/2411* (2013.01); *F01L 2001/0535* (2013.01); *F01L 2105/00* (2013.01)

(58) Field of Classification Search
CPC ..... F01L 2105/00; F01L 13/06; F01L 1/2405; F01L 1/24; F01L 1/2411; F16K 15/044; F16K 15/183
USPC .......................................................... 123/321
See application file for complete search history.

(56) References Cited

U.S. PATENT DOCUMENTS

| | | | |
|---|---|---|---|
| 5,806,477 A * | 9/1998 | Regueiro | F01L 1/185 123/90.22 |
| 5,992,376 A * | 11/1999 | Okada | F02D 13/04 123/321 |
| 8,800,520 B2 | 8/2014 | D'Amore | |
| 9,016,249 B2 * | 4/2015 | Roberts | F01L 1/08 123/90.16 |
| 2005/0211206 A1 * | 9/2005 | Ruggiero | F01L 1/08 123/90.16 |
| 2008/0072857 A1 * | 3/2008 | Sailer | F01L 1/24 123/90.55 |
| 2011/0079195 A1 | 4/2011 | Dilly | |
| 2014/0130774 A1 * | 5/2014 | Le Forestier | F01L 13/0021 123/321 |
| 2015/0144096 A1 * | 5/2015 | Meneely | F01L 1/18 123/321 |
| 2015/0354418 A1 * | 12/2015 | Jo | F01L 13/065 123/323 |
| 2017/0016358 A1 * | 1/2017 | Yoon | F01L 1/181 |
| 2017/0175597 A1 * | 6/2017 | Cecur | F01L 1/16 |
| 2017/0321576 A1 * | 11/2017 | Nielsen | F01L 1/2416 |

* cited by examiner

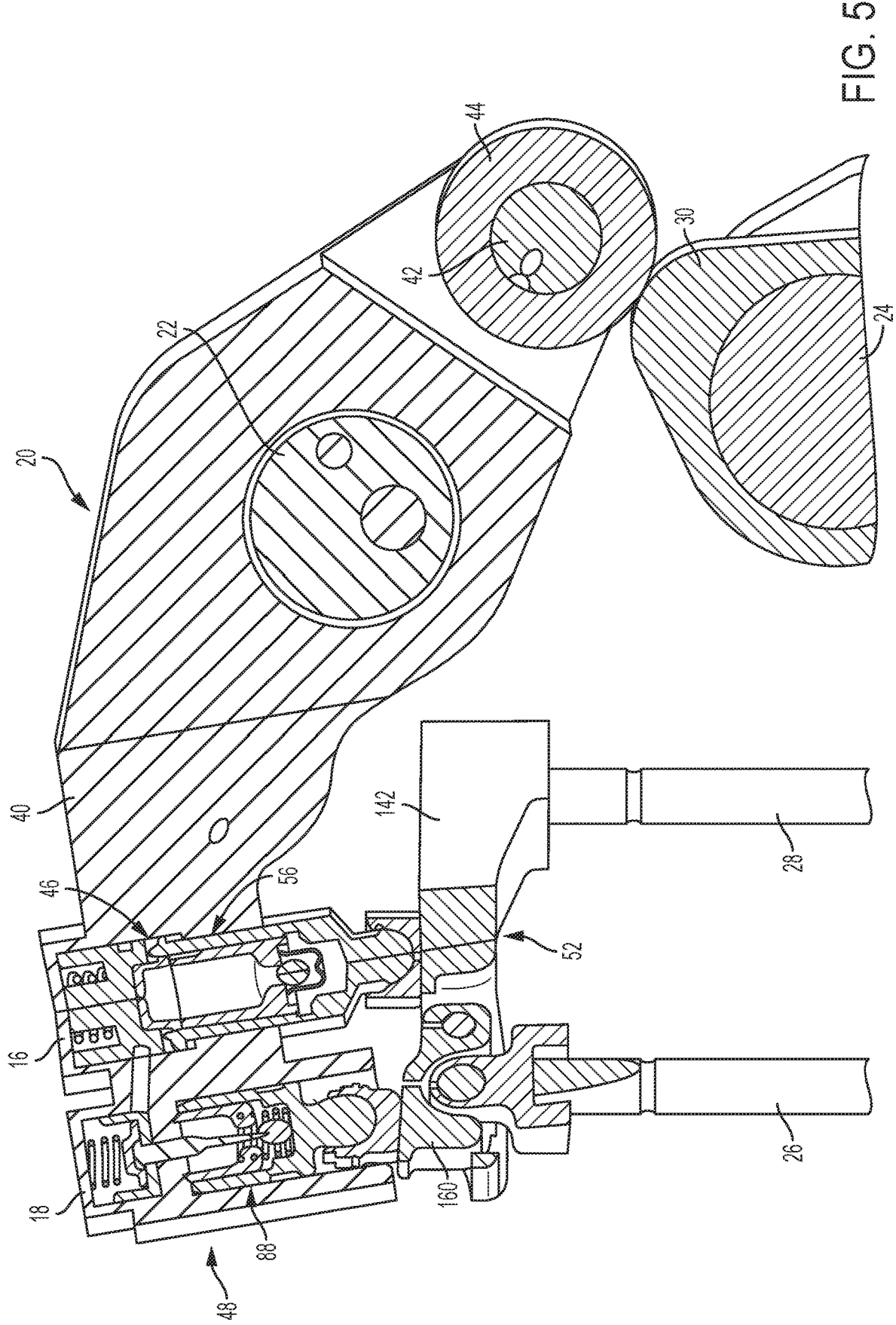

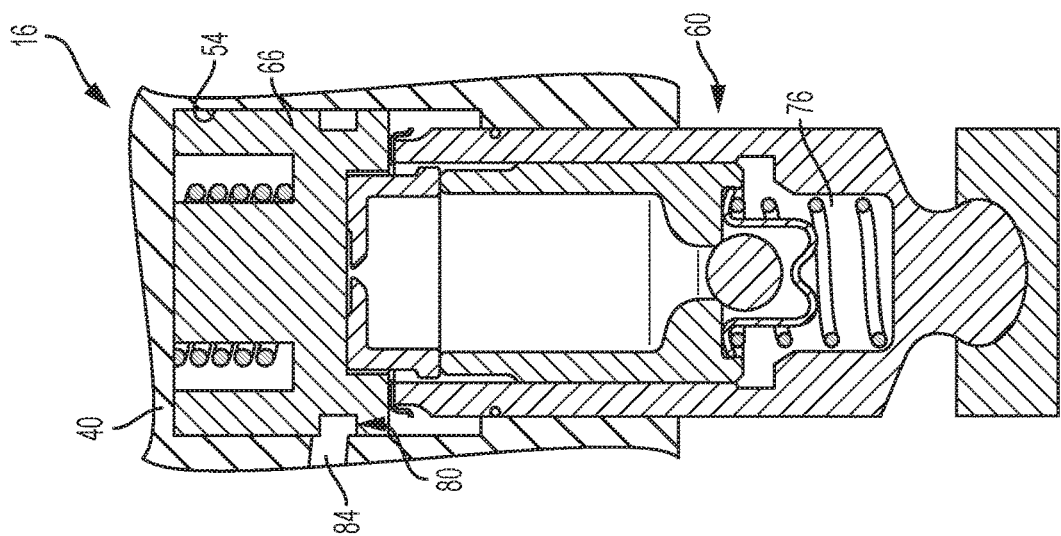
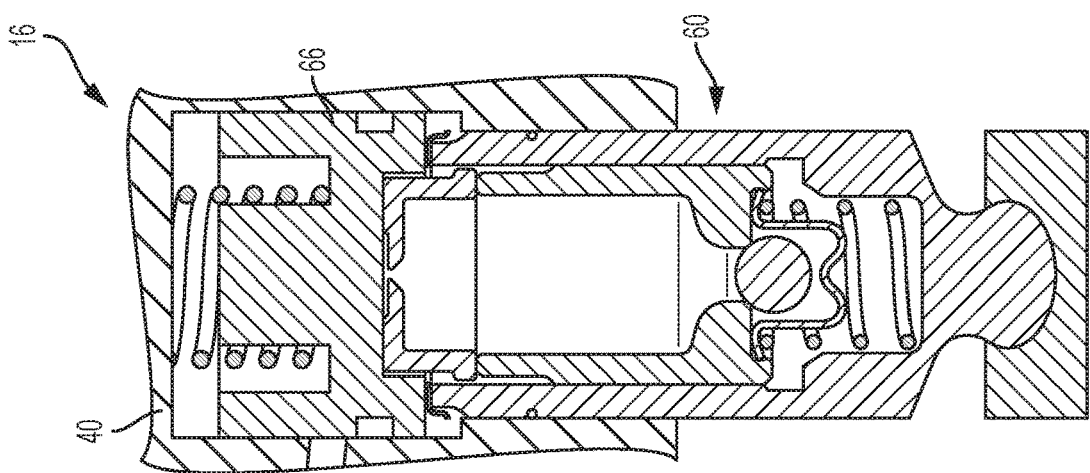
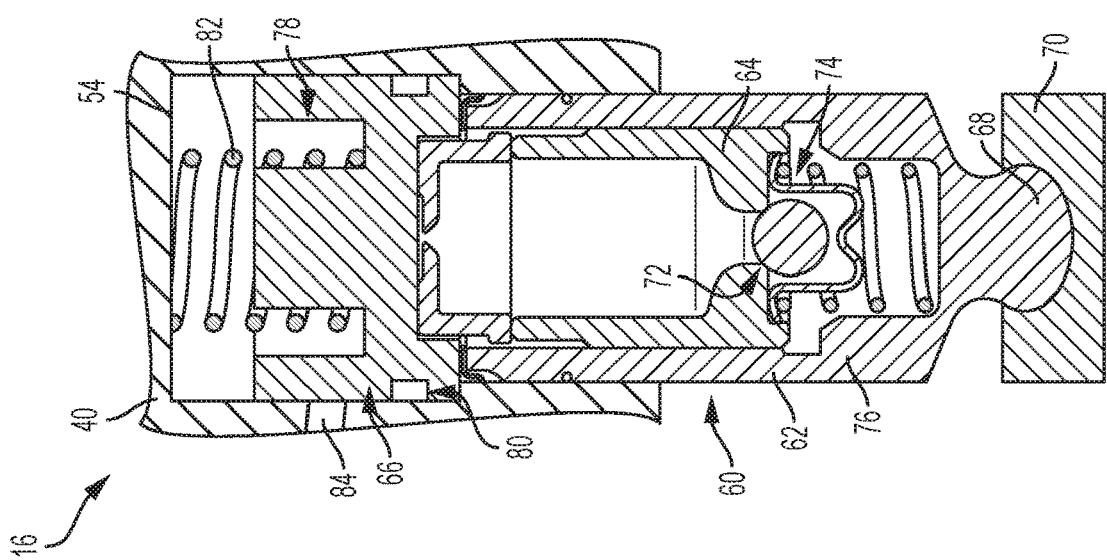

ROCKER ARM ASSEMBLY

CROSS-REFERENCE TO RELATED APPLICATIONS

This application is a continuation of International Application No. PCT/US2016/069452 filed Dec. 30, 2016, which claims the benefit of Indian Patent Application No. 201611014772 filed Apr. 28, 2016, and Indian Patent Application No. 201611009132 filed Mar. 16, 2016. The disclosures of the above applications are incorporated herein by reference.

FIELD

The present disclosure relates generally to a rocker arm assembly for use in a valve train assembly and, more particularly, to a rocker arm assembly having an engine braking bridge.

BACKGROUND

Compression engine brakes can be used as auxiliary brakes in addition to wheel brakes, for example, on relatively large vehicles powered by heavy or medium duty diesel engines. A compression engine braking system is arranged, when activated, to provide an additional opening of an engine cylinder's exhaust valve when the piston in that cylinder is near a top-dead-center position of its compression stroke so that compressed air can be released through the exhaust valve. This causes the engine to function as a power consuming air compressor which slows the vehicle.

In a typical valve train assembly used with a compression engine brake, the exhaust valve is actuated by a rocker arm which engages the exhaust valve by means of a valve bridge. The rocker arm rocks in response to a cam on a rotating cam shaft and presses down on the valve bridge which itself presses down on the exhaust valve to open it. A hydraulic lash adjuster may also be provided in the valve train assembly to remove any lash or gap that develops between the components in the valve train assembly.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one aspect of the present disclosure, a combined exhaust and engine brake rocker arm assembly configured to selectively open first and second exhaust valves is provided. The assembly includes a rocker arm body, an exhaust rocker arm assembly formed in the rocker arm body, and an engine brake rocker arm assembly formed in the rocker arm body and configured to operate in a collapse mode and a rigid mode. The exhaust rocker arm assembly is configured to selectively engage a valve bridge to open the first and second exhaust valves, and the engine brake rocker arm assembly is configured to selectively engage the valve bridge to open only the first exhaust valve.

In addition to the foregoing, the combined exhaust and engine brake rocker arm assembly may include one or more of the following features: wherein the exhaust rocker arm assembly comprises an exhaust capsule assembly disposed in a bore formed in the rocker arm body; wherein the exhaust capsule assembly comprises a plunger assembly and a stopper, the plunger assembly including a first plunger body and a second plunger body, wherein a chamber is defined between the first and second plunger bodies configured to receive a supply of fluid; wherein the stopper includes an annular bore formed therein; a lost motion biasing mechanism at least partially disposed in the annular bore, the lost motion biasing mechanism configured to bias the stopper and the plunger assembly away from an upper wall of the bore; wherein the stopper includes an annular groove formed therein, the annular groove configured to selectively align with a fluid port fluidly coupled to the engine brake rocker arm assembly; wherein the engine brake rocker arm assembly comprises a brake capsule assembly disposed in a bore formed in the rocker arm; wherein the bore comprises a first bore and a second bore formed in the rocker arm, the brake capsule assembly comprising a brake plunger assembly disposed in the first bore, and an actuator assembly disposed in the second bore; wherein the brake plunger assembly includes a check ball assembly and a first plunger body movable relative to a second plunger body, the first and second plunger bodies defining a chamber therebetween configured to receive a supply of fluid, the check ball assembly disposed in the chamber between the first and second plunger bodies; and wherein the actuator assembly comprises a pin disposed in a retainer, the pin operably associated with the check ball assembly, wherein the second bore is configured to receive a supply of fluid such that the retainer is translated upwardly within the bore to draw the pin away from contact with the check ball assembly.

In another aspect of the present disclosure, a valve train assembly associated with first and second exhaust valves is provided. The assembly includes a valve bridge including a main body and a lever rotatably coupled to the main body, the main body configured to engage the first exhaust valve, and the lever configured to engage the second exhaust valve, and a combined exhaust and engine brake rocker arm assembly. The combined exhaust and engine brake rocker arm assembly includes a rocker arm body, an exhaust rocker arm assembly formed in the rocker arm body, and an engine brake rocker arm assembly formed in the rocker arm body and configured to operate in a collapse mode and a rigid mode. The exhaust rocker arm assembly is configured to selectively engage the valve bridge main body to open the first and second exhaust valves, and the engine brake rocker arm assembly is configured to selectively engage the valve bridge lever to open only the first exhaust valve.

In addition to the foregoing, the valve train assembly may include one or more of the following features: wherein the exhaust rocker arm assembly comprises an exhaust capsule assembly disposed in a bore formed in the rocker arm body, wherein the exhaust capsule assembly comprises a plunger assembly and a stopper, the plunger assembly including a first plunger body and a second plunger body, wherein a chamber is defined between the first and second plunger bodies configured to receive a supply of fluid; wherein the stopper includes an annular bore formed therein, and a lost motion biasing mechanism is at least partially disposed in the annular bore, the lost motion biasing mechanism configured to bias the stopper and the plunger assembly away from an upper wall of the bore; wherein the stopper includes an annular groove formed therein, the annular groove configured to selectively align with a fluid port fluidly coupled to the engine brake rocker arm assembly; wherein the engine brake rocker arm assembly comprises a brake capsule assembly disposed in a bore formed in the rocker arm, wherein the bore comprises a first bore and a second bore formed in the rocker arm, the brake capsule assembly comprising a brake plunger assembly disposed in the first bore, and an actuator assembly disposed in the second bore; wherein the brake plunger assembly includes a check ball assembly and a first plunger body movable relative to a second plunger body, the first and second plunger bodies defining a chamber therebetween configured to receive a supply of fluid, the check ball assembly disposed in the chamber between the first and second plunger bodies; wherein the actuator assembly comprises a pin disposed in a retainer, the pin operably associated with the check ball assembly, wherein the second bore is configured to receive a supply of fluid such that the retainer is translated upwardly within the bore to draw the pin away from contact with the check ball assembly; wherein the first plunger body is received by a socket coupled to the valve bridge lever; wherein the lever is coupled to the main body such that rotation of the lever and engagement of the first exhaust valve occurs without rotation of the main body, wherein the main body includes an aperture, the lever at least partially disposed within the aperture, wherein the lever is rotatably coupled to the main body by a bridge pin extending through the main body; and a valve shoe rotatably coupled to the lever, the valve shoe configured to engage the first exhaust valve, wherein the valve shoe is rotatably coupled to the lever by a valve shoe pin extending through the lever.

In another aspect of the present disclosure, a method of manufacturing a combined exhaust and engine brake rocker arm assembly configured to selectively open first and second exhaust valves is provided. The method includes providing a rocker arm body, forming an exhaust rocker arm assembly in the rocker arm body by forming a first bore and disposing an exhaust capsule assembly in the first bore, the exhaust capsule assembly having a plunger assembly and a stopper, the plunger assembly including a first plunger body and a second plunger body, wherein a chamber is defined between the first and second plunger bodies configured to receive a first supply of fluid, and forming an engine brake rocker arm assembly in the rocker arm body by forming a second bore and a third bore in the rocker arm body and disposing a brake capsule assembly in the second and third bores, the brake capsule assembly comprising a brake plunger assembly disposed in the second bore, and an actuator assembly disposed in the third bore. The brake plunger assembly includes a check ball assembly and a third plunger body movable relative to a fourth plunger body, the third and fourth plunger bodies defining a chamber therebetween configured to receive a second supply of fluid, the check ball assembly disposed in the chamber between the third and fourth plunger bodies.

BRIEF DESCRIPTION OF THE DRAWINGS

The present disclosure will become more fully understood from the detailed description and the accompanying drawings, wherein:

FIG. 5 is a cutaway view of the combined exhaust and engine brake rocker arm assembly shown in FIG. 2 in a third mode;

FIG. 6A is a cross-sectional view of the exhaust capsule shown in FIGS. 2-5 in a first position;

FIG. 6B is a cross-sectional view of the exhaust capsule shown in FIG. 6A in a second position;

FIG. 6C is a cross-sectional view of the exhaust capsule shown in FIG. 6A in a third position;

DETAILED DESCRIPTION

Figure 1:
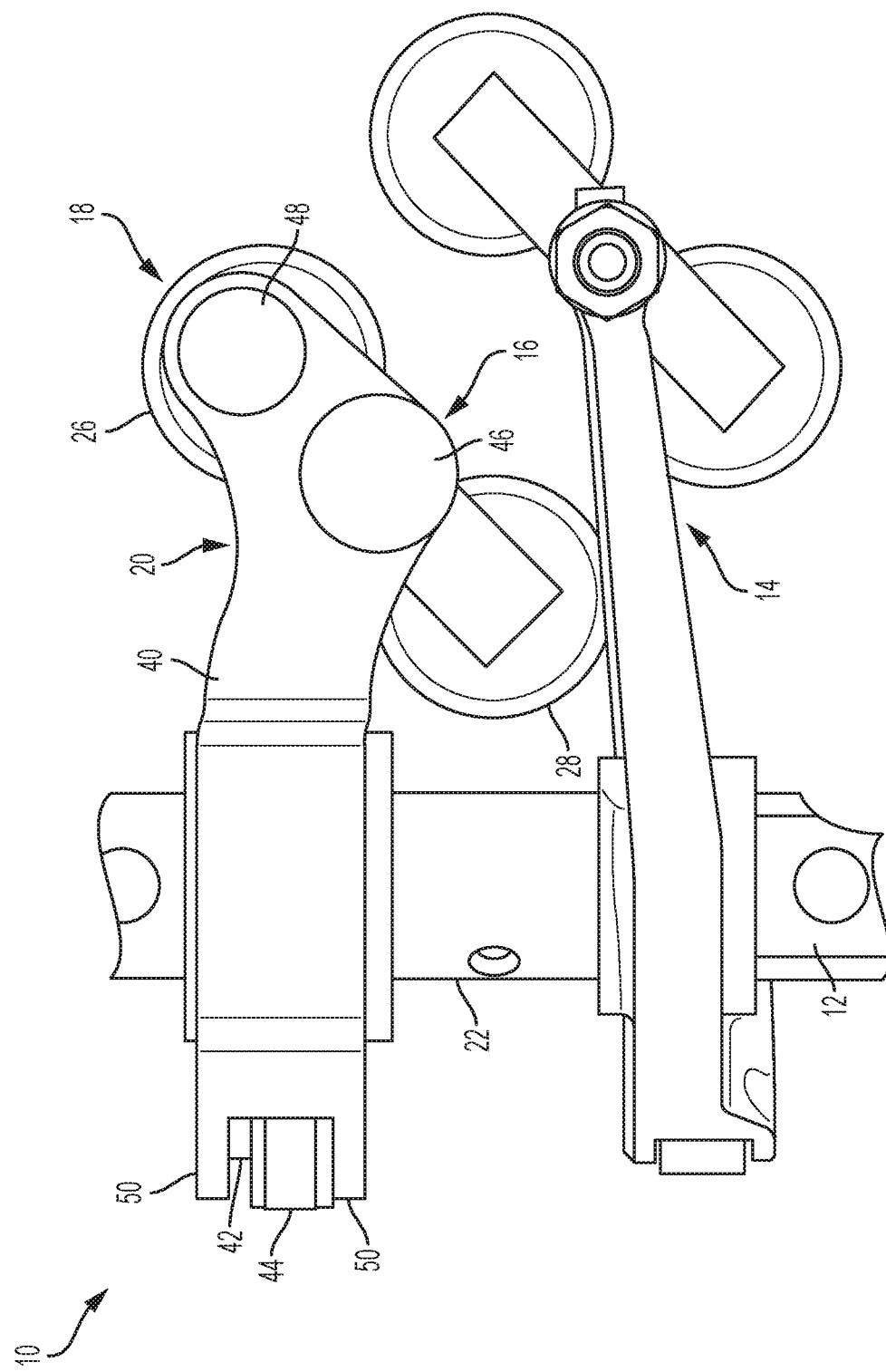
FIG. 1 is a plan view of a valve train assembly incorporating a rocker arm assembly that includes an intake rocker arm assembly and a combined exhaust rocker arm assembly and engine brake rocker arm assembly, constructed in accordance to one example of the present disclosure.
Figure 2:
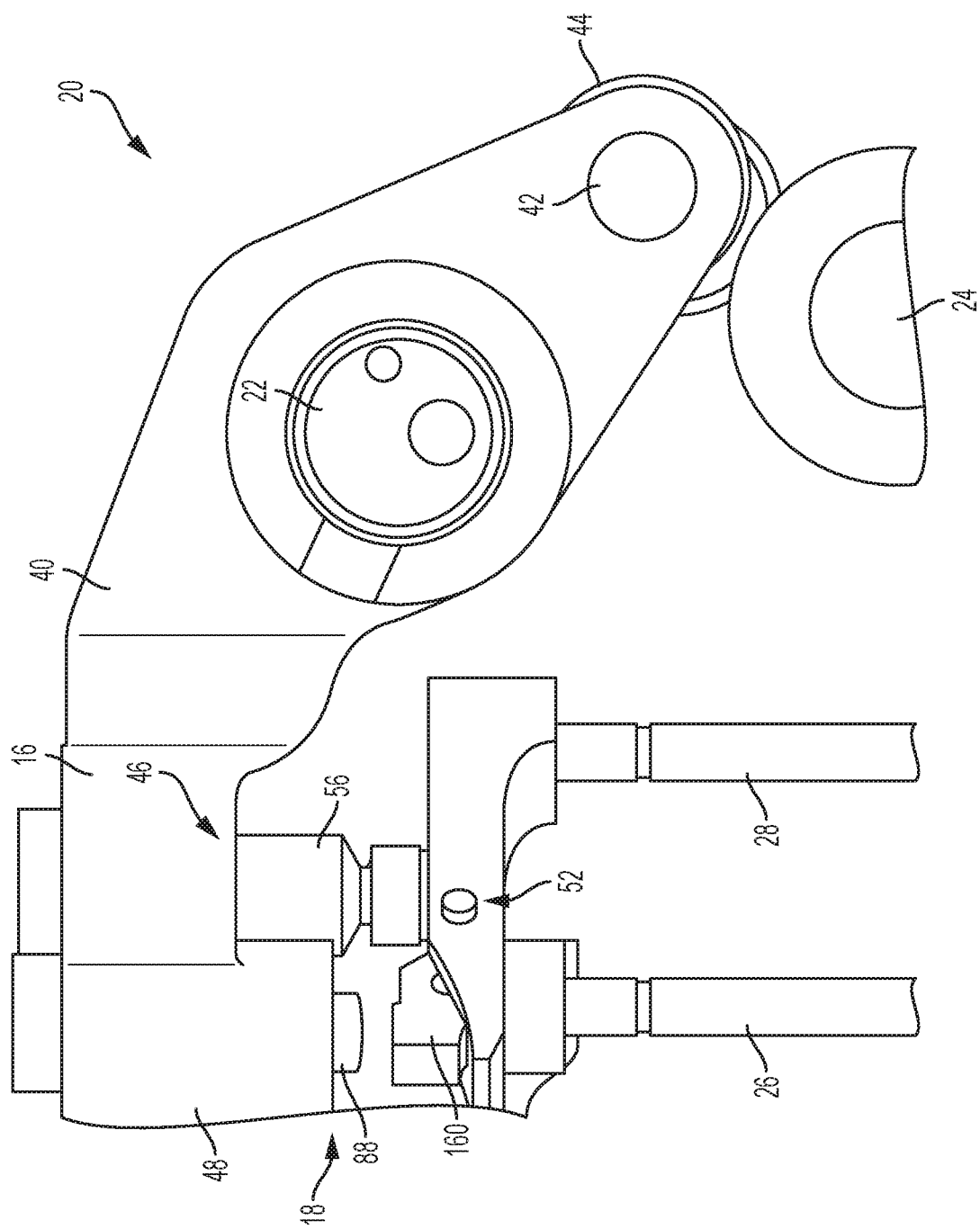
FIG. 2 is a perspective view of the combined rocker arm assembly shown in FIG. 1, including an exhaust capsule and an engine brake capsule constructed in accordance to one example of the present disclosure.

With initial reference to FIGS. 1 and 2, a partial valve train assembly constructed in accordance to one example of the present disclosure is shown and generally identified at reference 10. The partial valve train assembly 10 utilizes engine braking and is shown configured for use in a three-cylinder bank portion of a six-cylinder engine. It will be appreciated however that the present teachings are not so limited. In this regard, the present disclosure may be used in any valve train assembly that utilizes engine braking. The partial valve train assembly 10 is supported in a valve train carrier 12 and can include two rocker arms per cylinder.

Specifically, each cylinder includes an intake valve rocker arm assembly 14, an exhaust rocker arm assembly 16, and an engine brake rocker arm assembly 18. However, as illustrated, the exhaust valve rocker arm assembly 16 and the engine brake rocker arm assembly 18 are combined into a single rocker arm and are collectively referred to as a combined exhaust and engine brake rocker arm assembly 20, which cooperates to control opening of the exhaust valves. The intake valve rocker arm assembly 14 is configured to control motion of the intake valves, the exhaust valve rocker arm assembly 16 is configured to control exhaust valve motion in a drive mode, and the engine brake rocker arm assembly 18 is configured to act on one of the two exhaust valves in an engine brake mode, as will be described herein.

A rocker shaft 22 is received by the valve train carrier 12 and supports rotation of the combined exhaust and engine brake rocker arm assembly 20. As described herein in more detail, the rocker shaft 22 can communicate oil to the assemblies 16, 18 during operation. A cam shaft 24 (FIG. 2) includes lift profiles or cam lobes configured to rotate assemblies 16, 18 to activate first and second exhaust valves 26 and 28, as is described herein in more detail. For example, FIG. 3 illustrates cam shaft 24 with an exhaust event lift profile or lobe 30 and a brake event lift profile or lobe 32, which respectively cause combined rocker arm assembly 20 to operate in an exhaust event mode and a brake event mode.

Figure 3:
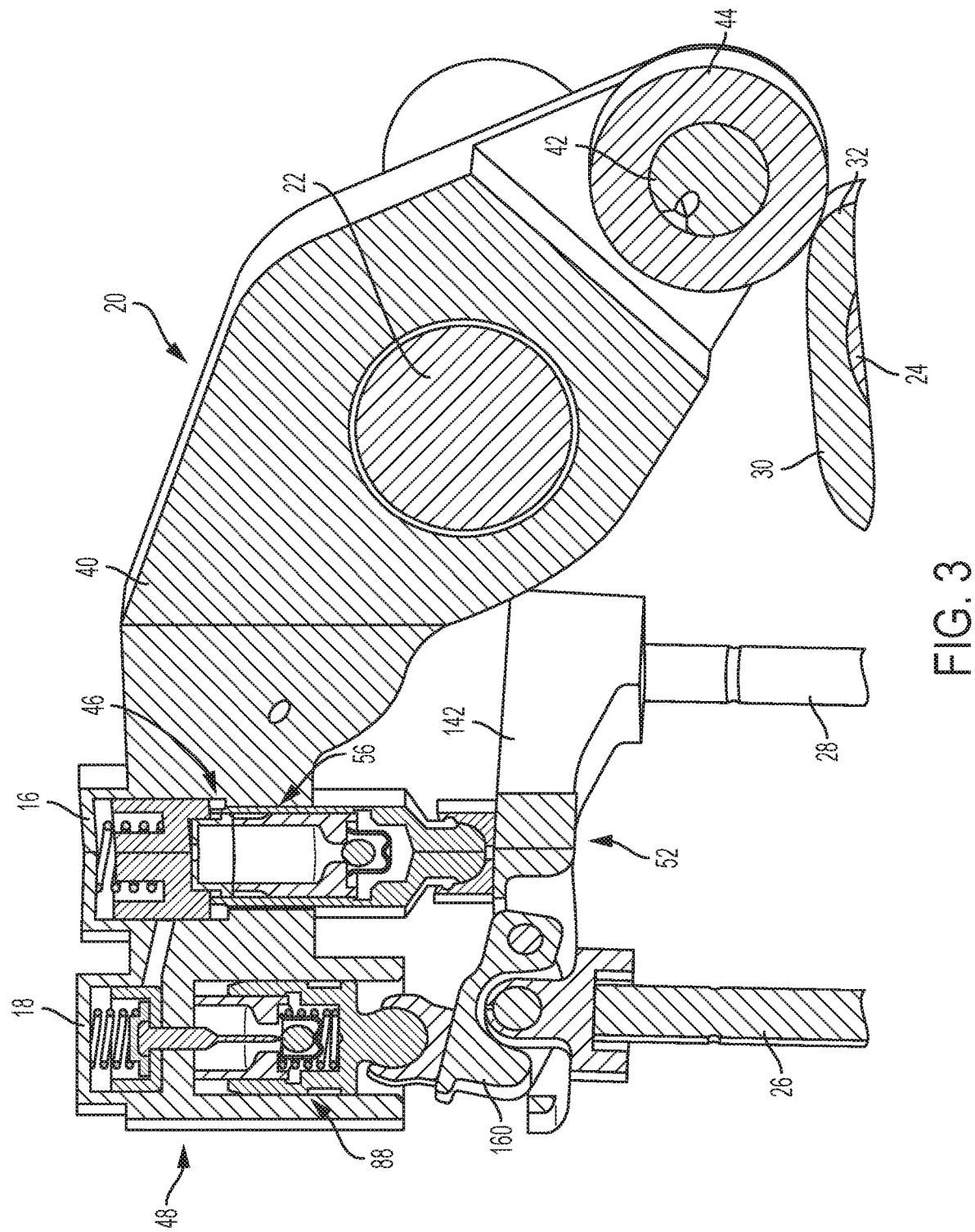
FIG. 3 is a cutaway view of the combined exhaust and brake rocker arm assembly shown in FIG. 2 in a first mode.

With further reference now to FIGS. 1-3, the combined exhaust and engine brake rocker arm assembly 20 will now be further described. The combined rocker arm assembly 20 can generally include a rocker arm body 40, an axle 42, and a roller 44. The rocker arm body 40 includes an exhaust rocker arm portion 46, and an engine brake arm portion 48. Rocker arm body 40 can receive the rocker shaft 22 and defines a pair of flanges 50 to receive the axle 42 such that roller 44 is positioned at least partially therebetween. As such, the axle 42 can be coupled to the rocker arm body 40 and can receive the roller 44, which is configured to be engaged by the exhaust lift lobe 30 or engine brake lobe 32 of the cam shaft 24. This engagement of the roller causes combined rocker arm assembly 20 to engage a valve bridge assembly 52, as described herein in more detail.

The exhaust valve rocker arm assembly 16 can include exhaust rocker arm portion 46, which defines a bore 54 configured to at least partially receive a hydraulic lash adjuster (HLA) assembly or exhaust capsule 56. When roller 44 is engaged by the exhaust lift profile 30, the exhaust rocker arm portion 46 and exhaust capsule 56 can be rotated downward, causing downward movement of the valve bridge assembly 52, which engages the first and second exhaust valve 26 and 28 (FIG. 2) associated with a cylinder of an engine (not shown).

The exhaust capsule 56 is configured to take up any lash between the exhaust capsule assembly 36 and the valve bridge assembly 52. With additional reference to FIGS. 6A-6C, in one exemplary implementation, the exhaust capsule assembly 36 can comprise a plunger assembly 60 including an outer plunger or first plunger body 62, an inner or second plunger body 64, and a stopper 66. The plunger assembly 60 is received by bore 54 defined in arm portion 46, and can have a first closed end defining a spigot 68, which is received in a socket 70 that acts against the valve bridge assembly 52. The second plunger body 64 has an opening that defines a valve seat 72, and a check ball assembly 74 can be positioned between the first and second plunger bodies 62, 64.

The check ball assembly 74 can be configured to hold oil within a chamber 76 between the first and second plunger bodies 54, 56. A biasing mechanism 77 (e.g., a spring) biases second plunger body 64 upward (as shown in FIGS. 6A-6C) to expand the first plunger body 62 to take up any lash. As second plunger body 64 is biased upward, oil is drawn through check ball assembly 74 and into the chamber 76 between plunger bodies 62, 64. Accordingly, oil can be supplied from rocker shaft 22 through a channel (not shown) to the chamber within second plunger 64, and downward pressure can cause downward movement of the first plunger body 62 due to the oil in the chamber 76. However, exhaust capsule assembly 36 may have any other suitable configuration that enables capsule assembly 36 to take up lash between the capsule assembly and the valve bridge assembly 52.

The stopper 66 is disposed within bore 54 above the first and second plunger bodies 62, 64 and generally includes an annular or generally annular bore 78 and an annular or generally annular groove 80. The annular bore 78 is configured to receive and seat at least a portion of a lost motion biasing mechanism 82 (e.g., a spring) such that the biasing mechanism 82 is disposed between the rocker arm body 40 and the lost motion plunger body 66. Biasing mechanism 82 can be configured to bias lost motion plunger body 66 downward (as shown in FIGS. 6A-6C) and to selectively absorb motion of the rocker arm assembly 20, as described herein in more detail. Annular groove 80 is formed in an outer wall of stopper 66 and is configured to selectively receive a hydraulic fluid from a fluid port 84 that is formed in rocker arm body 40 when annular groove 80 and fluid port 84 are aligned, as shown in FIG. 6C and described herein in more detail.

With continued reference now to FIGS. 1-3, engine brake rocker arm assembly 18 will be further described. The engine brake rocker arm assembly 18 can generally include engine brake rocker arm portion 48, which defines a bore 86 configured to at least partially receive a HLA assembly or brake capsule assembly 88. When roller 44 is engaged by the engine brake lift profile 32, the engine brake rocker arm portion 84 and brake capsule assembly 88 can be rotated downward, causing downward movement of the valve bridge assembly 52, which engages only the first exhaust valve 26 (i.e., not valve 28), as described herein in more detail.

The brake capsule assembly 88 is configured to selectively move from a collapsing mode (FIG. 7A) to a rigid mode (FIG. 7B) to selectively transfer cam motion to the valve 26 during an engine braking event. With additional reference to FIGS. 7A and 7B, in one example implementation, the brake capsule assembly 88 can generally include a brake plunger assembly 90 and an actuator assembly 92.

In the example implementation, the brake plunger assembly 90 can comprise a leak down plunger or first plunger body 94 and a ball plunger or second plunger body 96. The plunger assembly 90 is received by bore 86 defined in rocker arm portion 84, and can have a first closed end defining a spigot 98, which is received in a socket 100 that acts against the valve bridge assembly 52. The second plunger body 96 has an opening that defines a valve seat 102, and a check ball assembly 104 can be positioned between the first and second plunger bodies 94, 96.

Figure 7B:
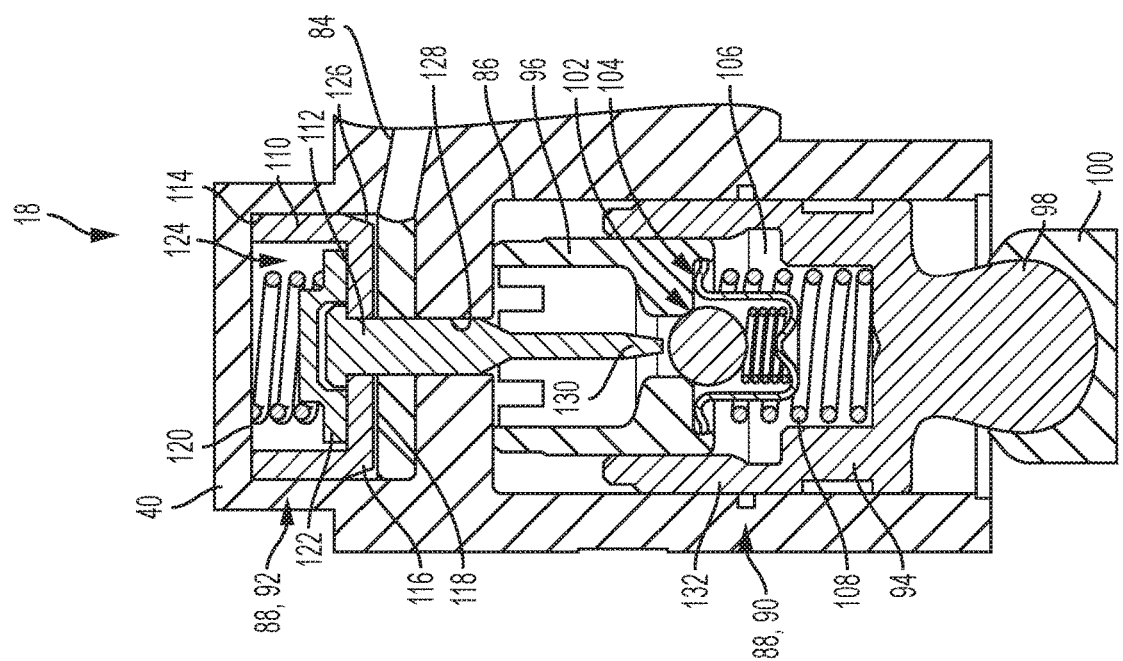
FIG. 7B is a cross-sectional view of the engine brake capsule shown in FIG. 7A in a second position.
Figure 7A:
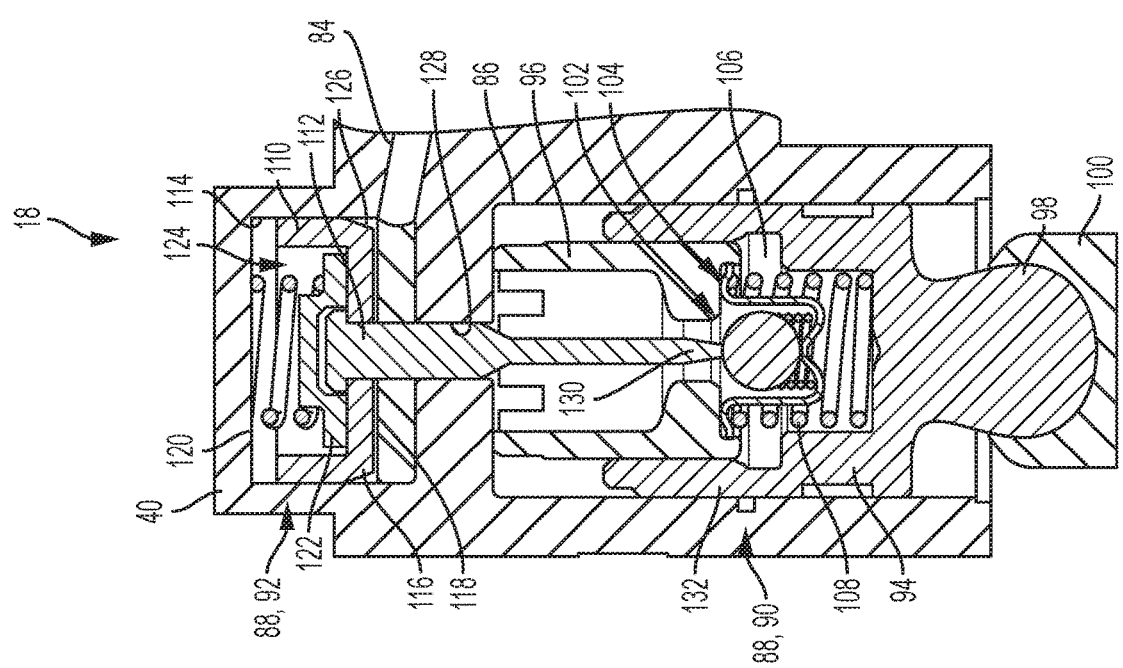
FIG. 7A is a cross-sectional view of the engine brake capsule shown in FIGS. 2-5 in a first position.

The check ball assembly 104 can be configured to hold oil within a chamber 106 between the first and second plunger bodies 94, 96. A biasing mechanism 108 (e.g., a spring) biases second plunger body 96 upward (as shown in FIGS. 7A and 7B) to expand the first plunger body 94 and move to the rigid mode. As second plunger body 96 is biased upward, oil is drawn through check ball assembly 104 and into the chamber 106 between plunger bodies 94, 96. Accordingly, oil can be supplied from rocker shaft 22 through a channel (not shown) to the chamber within second plunger 96, and downward pressure can cause downward movement of the first plunger body 94 due to the oil in the chamber 106. However, plunger assembly 90 may have any other suitable configuration that enables brake capsule assembly 88 to function as described herein.

The actuator assembly 92 generally includes a retainer 110 and a pin 112. In the example implementation, actuator assembly 92 is received in a secondary bore 114 defined in rocker arm portion 84 and fluidly coupled to hydraulic fluid port 84. The retainer 110 includes a closed end 116 having an aperture 118 formed therein configured to receive pin 112. A biasing mechanism 120 (e.g., a spring) and a biasing mechanism seat 122 are disposed within a chamber 124 formed within retainer 110 such that biasing mechanism 120 is configured to bias the retainer 110 downward toward the brake plunger assembly 90. Retainer 110 includes a chamfered edge 126 such that hydraulic fluid supplied through port 84 provides an upward force against retainer 110.

The pin 112 extends through retainer 110 and an aperture 128 formed between bores 86 and 114 such that a distal end 130 of pin 112 is disposed proximate a ball 132 of the check ball assembly 104. By supplying high pressure fluid to secondary bore 114 via fluid port 84, actuator assembly 92 can be lifted from a lowered position (FIG. 7A) to a raised position (FIG. 7B). In particular, the supplied fluid acts against chamfered edge 126 and the bottom surface of retainer 110 to force the actuator assembly 92 to the raised position.

In the lowered position, pin 112 pushes the ball 132 downward and away from valve seat 102 such that low pressure oil is not trapped in chamber 106, thereby enabling plunger assembly 90 to operate in the collapse mode where the first plunger body 94 can slide upwardly around second plunger body 96.

When high pressure oil is supplied to port 84, actuator assembly 92 moves upwardly to the raised position such that pin 112 is raised and the ball 132 is biased against the valve seat 102. As such, oil is trapped in chamber 106 and becomes pressurized when loaded during brake events, thereby enabling plunger assembly 90 to operate in the rigid mode and transmit motion from cam 24 to the brake valve 26 to enable the braking event.

Many known engines with hydraulic valve lash adjustment have a single rocker arm that actuates two valves through a valve bridge across those valves. The engine brake bypasses the bridge and pushes on one of the valves, which cocks or angles the valve bridge, to open a single valve and blow down the cylinder. However, due to the cocked valve bridge, the HLA can react by extending to take up the lash created. This may be undesirable because, after the brake event, the extended HLA assembly can then hold the exhaust valves open with certain loss of compression and possibly piston-to-valve contact.

To overcome this potentially undesirable event, assembly 10 includes valve bridge assembly 52 having a movable lever assembly 140 integrated therein. The lever assembly 140 can pass some of the valve actuation force back to the exhaust capsule assembly 36 (via bridge 52), thereby preventing unintended extension of the exhaust capsule assembly during the braking event. Thus, lever assembly 140 allows the valve 26 to open during the engine braking operation without allowing downward motion of the valve bridge assembly 52. Moreover, lever assembly 140 significantly reduces the actuation force required for the braking event compared to known systems.

Figure 8:
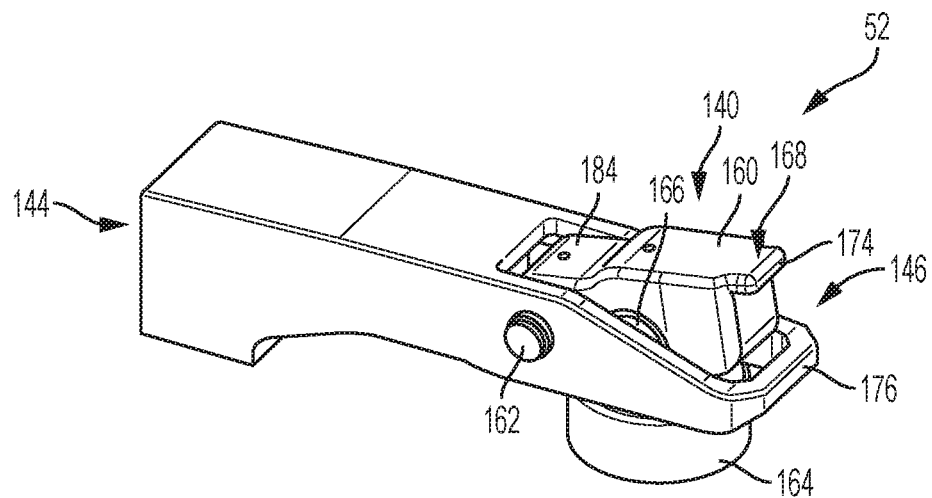
FIG. 8 is a perspective view of a valve bridge assembly of the rocker arm assembly shown in FIG. 1, constructed in accordance to one example of the present disclosure.
Figure 9:
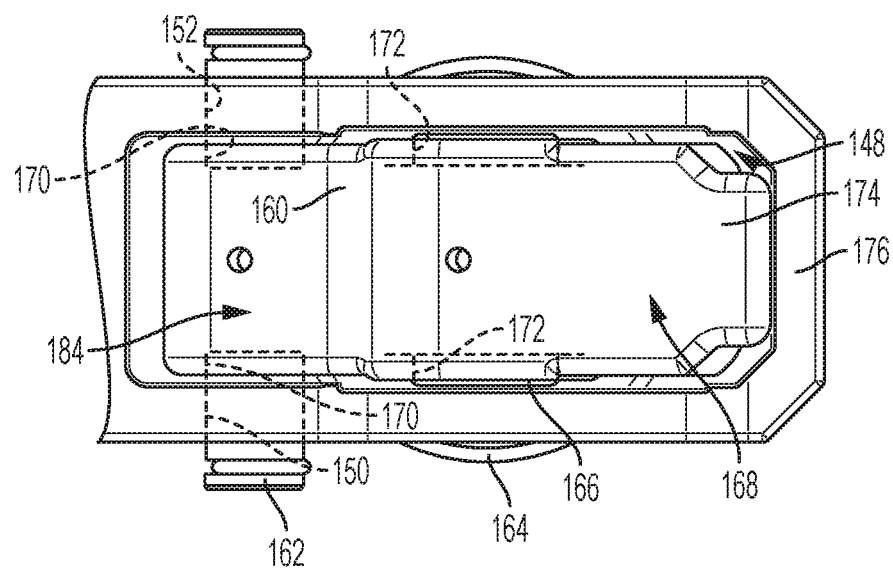
FIG. 9 is a plan view of a portion of the valve bridge assembly shown in FIG. 8.

With additional reference to FIGS. 8 and 9, in one exemplary implementation, the valve bridge assembly 52 comprises the lever assembly 140 disposed within a main bridge main body 142. The bridge main body 142 includes a first end 144 and a second end 146. The first end 144 can be configured to engage valve 28, and the second end 146 can include a first aperture 148, a second aperture 150, and a third aperture 152.

As shown in FIG. 8, the lever assembly 140 can generally include a lever 160, a bridge pin 162, a valve shoe 164, and a valve shoe pin 166. The lever 160 can be disposed within the first aperture 148 and is rotatably coupled to the bridge main body 142 by the bridge pin 162, which extends through the second and third apertures 140, 142 of the bridge main body 142.

The lever 160 includes an engagement surface 168, first opposed openings 170, second opposed openings 172, and a stop flange 174. The engagement surface 168 is configured to be selectively engaged by socket 100 of brake plunger assembly 90. In one example, socket 100 is coupled to lever 160 to maintain constant contact for dynamic stability. First opposed openings 170 can receive the bridge pin 162, and the second opposed openings 172 can receive the valve shoe pin 166. The stop flange 174 can be configured to engage a bar 176 (FIGS. 8 and 9) of the bridge main body 142 to limit downward movement of the lever 160 (as shown in FIG. 8).

The valve shoe 164 includes a main body portion 178 and a connecting portion 180 having an aperture 182 formed therein. The main body portion 178 is configured to receive a portion of the valve 26, and the connecting portion 180 is at least partially disposed within lever 160 such that the connecting portion aperture 182 receives the valve shoe pin 166 to rotatably couple the valve shoe 164 to the lever 160.

Accordingly, lever 160 can be selectively engaged at the engagement surface 168, which can cause rotation about pin 166 and upward movement of an opposed side 174 of the lever that is opposite surface 168. This upward movement of lever end 174 causes upward movement of bridge main body 142 toward exhaust capsule assembly 36 to prevent extension thereof.

As such, during operation of rocker arm assembly 20, the exhaust rocker arm assembly 16 can selectively engage the valve bridge main body 142 to actuate valves 26, 28 and perform a normal exhaust event (combustion mode); whereas, the engine brake rocker arm assembly 18 can selectively engage the lever assembly 140 to only actuate valve 26 and perform a brake event actuation (engine braking mode).

With reference now to FIGS. 3-7, an exemplary operating sequence of the combined exhaust and engine brake rocker arm assembly 20 will be described. In particular, rocker arm assembly 20 can operate in the following four modes: (1) a braking event with deactivated braking, (2) a braking event with activated braking, (3) an exhaust event with deactivated braking, and (4) an exhaust event with activated braking.

FIGS. 3, 6A, 6B, and 7A illustrate rocker arm assembly 20 operating in (1) the braking event with deactivated braking mode. As shown in FIG. 3, rocker arm assembly 20 is engaged by the brake lift cam profile 32 of cam shaft 24. In particular, as cam shaft 24 rotates, cam profile 32 engages roller 44, which causes the rocker arm 40 and thus rocker arm assemblies 16, 18 to rotate about the rocker shaft 22. However, high pressure fluid is not supplied through fluid port 84, which causes brake plunger assembly 90 to operate in the collapse mode (FIG. 7A) where the first plunger body 94 can slide upwardly around second plunger body 96. Accordingly, as engine brake rocker arm assembly 18 is rotated downward and socket 100 contacts the engagement surface 168 of lever 160, brake plunger assembly 90 collapses such that engine brake rocker arm assembly 18 does not transfer the cam motion to the valve 26. At the same time, exhaust rocker arm assembly 16 is rotated downward and socket 70 contacts bridge main body 132. This forces plunger assembly 60 upward, which causes upward movement of stopper 66. Lost motion biasing mechanism 82 absorbs the brake lift such that exhaust rocker arm assembly 16 does not transfer the cam motion to valves 26, 28 (FIGS. 6A and 6B).

Figure 4:
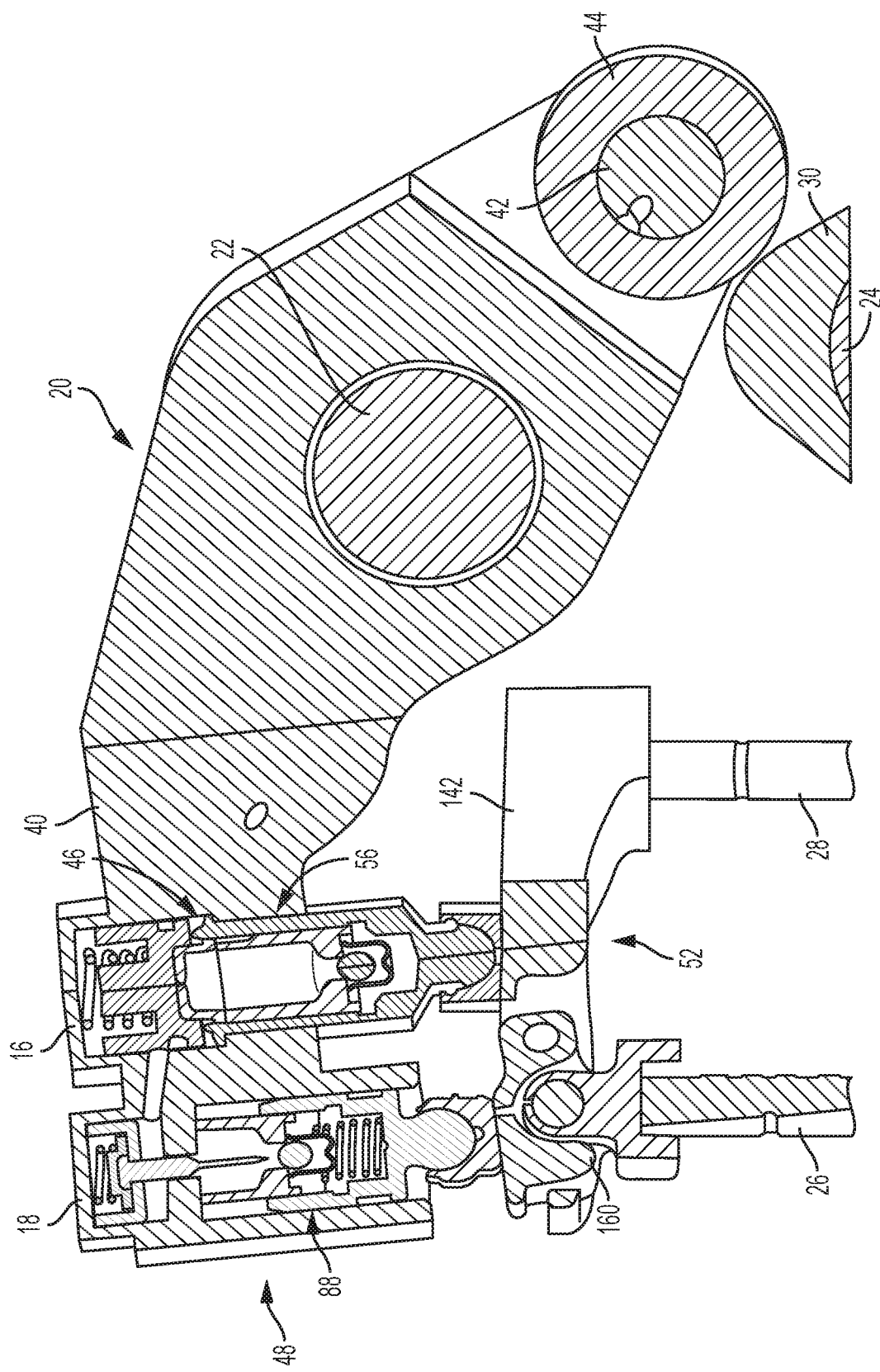
FIG. 4 is a cutaway view of the combined exhaust and engine brake rocker arm assembly shown in FIG. 2 in a second mode.

FIGS. 4, 6A, 6B, and 7B illustrate rocker arm assembly 20 operating in (2) the braking event with activated braking mode. As shown in FIG. 4, rocker arm assembly 20 is engaged by the brake lift cam profile 32 of cam shaft 24. In particular, as cam shaft 24 rotates, cam profile 32 engages roller 44, which causes the rocker arm 40 and thus rocker arm assemblies 16, 18 to rotate about the rocker shaft 22. In this mode, high pressure fluid is supplied through fluid port 84, which raises actuator assembly 92 such that brake plunger assembly 90 operates in the rigid mode (FIG. 7B) where first plunger body 94 does not move relative to second plunger body 96. Accordingly, as engine brake rocker arm assembly 18 is rotated downward and socket 100 contacts the engagement surface 168 of lever 160, the rigid brake plunger assembly 90 transfers the cam motion and opens valve 26 via lever 160. At the same time, exhaust rocker arm assembly 16 is rotated downward and socket 70 contacts bridge main body 132. This forces plunger assembly 60 upward, which causes upward movement of stopper 66. Lost motion biasing mechanism 82 absorbs the brake lift such that exhaust rocker arm assembly 16 does not transfer the cam motion to valves 26, 28.

FIGS. 5, 6A, 6C, and 7A illustrate rocker arm assembly 20 operating in (3) the exhaust event with deactivated braking mode. As shown in FIG. 5, rocker arm assembly 20 is engaged by the exhaust lift cam profile 30 of cam shaft 24. In particular, as cam shaft 24 rotates, cam profile 32 engages roller 44, which causes the rocker arm 40 and thus rocker arm assemblies 16, 18 to rotate about the rocker shaft 22. However, high pressure fluid is not supplied through fluid port 84, which causes brake plunger assembly 90 to operate in the collapse mode (FIG. 7A) where the first plunger body 94 can slide upwardly around second plunger body 96. Accordingly, as engine brake rocker arm assembly 18 is rotated downward and socket 100 contacts the engagement surface 168 of lever 160, brake plunger assembly 90 collapses such that engine brake rocker arm assembly 18 does not transfer the cam motion to the valve 26. At the same time, exhaust rocker arm assembly 16 is rotated downward and socket 70 contacts bridge main body 132. This forces plunger assembly 60 upward, which causes upward movement of stopper 66. Lost motion biasing mechanism 82 absorbs the exhaust lift until stopper 66 contacts the upper wall of bore 54 (FIG. 6C). At this point, because exhaust lift cam profile 32 is larger than brake lift cam profile 30, exhaust rocker arm assembly 16 is rotated further downward than during the brake lift event. Because stopper 66 is in contact with the upper wall of bore 54, the cam motion is transferred through exhaust capsule 56 and moves the bridge main body 142 downward to open the first and second exhaust valves 26, 28.

FIGS. 5, 6A, 6C, 7A, and 7B illustrate rocker arm assembly 20 operating in (4) the exhaust event with activated braking mode. However, it may be undesirable to perform a braking event during an exhaust event. Accordingly, rocker arm assembly 20 is configured to reset the brake capsule assembly 88 to the collapse mode if braking mode is activated during an exhaust event.

In this configuration, rocker arm assembly 20 will look similar to that shown in FIG. 5A except brake capsule assembly 88 is in the activated mode (FIG. 7A) and supplied with high pressure fluid from port 84. To prevent the rigid brake plunger assembly 90 from transferring the cam motion and opening valve 26 (via lever 160), exhaust capsule assembly 56 is configured to vent the fluid that is lifting actuator assembly 92.

More specifically, in the example embodiment, when exhaust rocker arm assembly 16 is rotated downward, socket 70 contacts bridge main body 132. This forces plunger assembly 60 upward, which causes upward movement of stopper 66. Lost motion biasing mechanism 82 absorbs the exhaust lift until stopper 66 contacts the upper wall of bore 54 (FIG. 6C). At this point, annular groove 80 aligns with fluid port 84, which vents the high pressure fluid that is lifting actuator assembly 92 and causes brake plunger assembly 90 to return to the collapse mode. As such, engine brake rocker arm assembly 18 does not transfer the cam motion to the valve 26. However, because stopper 66 is in contact with the upper wall of bore 54, the cam motion is transferred through exhaust capsule 56 and moves the bridge main body 142 downward to open the first and second exhaust valves 26, 28.

Described herein are systems and methods for a single rocker arm assembly configured to selectively perform exhaust and engine braking events on an engine. The system includes a single rocker arm having an exhaust rocker arm assembly and an engine brake rocker arm assembly. The exhaust rocker arm assembly selectively engages a valve bridge to actuate two valves to perform an exhaust event. In one aspect, the valve bridge includes a main body and a lever integrated therein, the internal lever being rotatable relative to a valve bridge main. The engine brake rocker arm assembly includes a brake capsule assembly configured to be moved between a collapse mode and a rigid mode. In the collapse mode, the brake capsule does not transfer motion to the rotatable lever. In the rigid mode, the brake capsule transfers motion to the rotatable lever to actuate one of the two valves to perform an engine brake event.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A valve train assembly associated with first and second exhaust valves, the assembly comprising:
   a valve bridge including a main body and a lever rotatably coupled to the main body, the main body configured to engage the first and second exhaust valves, and the lever configured to engage the first exhaust valve; and
   a combined exhaust and engine brake rocker arm assembly comprising:
   a rocker arm body;
   an exhaust rocker arm assembly formed in the rocker arm body; and
   an engine brake rocker arm assembly formed in the rocker arm body and configured to operate in a collapse mode and a rigid mode,
   wherein the exhaust rocker arm assembly is configured to selectively engage the valve bridge main body to open the first and second exhaust valves,
   wherein the engine brake rocker arm assembly is configured to selectively engage the valve bridge lever to open only the first exhaust valve,
   wherein the lever is coupled to the main body such that rotation of the lever and engagement of the first exhaust valve occurs without rotation of the main body,
   wherein the main body includes an first aperture, the lever at least partially disposed within the first aperture,
   wherein the lever is rotatably coupled to the main body by a bridge pin extending through the main body,
   wherein the main body further includes a second aperture and a third aperture to each receive the bridge pin therethrough,
   wherein the lever includes first opposed openings each receiving the bridge pin therethrough, and
   wherein the lever includes second opposed openings.

2. The valve train assembly of claim 1, wherein the exhaust rocker arm assembly comprises an exhaust capsule assembly disposed in a bore formed in the rocker arm body, wherein the exhaust capsule assembly comprises a plunger assembly and a stopper, the plunger assembly including a first plunger body and a second plunger body, wherein a chamber is defined between the first and second plunger bodies configured to receive a supply of fluid.

3. The valve train assembly of claim 2, wherein the stopper includes an annular bore formed therein, and a lost motion biasing mechanism is at least partially disposed in the annular bore, the lost motion biasing mechanism configured to bias the stopper and the plunger assembly away from an upper wall of the bore.

4. The valve train assembly of claim 3, wherein the stopper includes an annular groove formed therein, the annular groove configured to selectively align with a fluid port fluidly coupled to the engine brake rocker arm assembly.

5. The valve train assembly of claim 1, wherein the engine brake rocker arm assembly comprises a brake capsule assembly disposed in a bore formed in the rocker arm,
wherein the bore comprises a first bore and a second bore formed in the rocker arm, the brake capsule assembly comprising a brake plunger assembly disposed in the first bore, and an actuator assembly disposed in the second bore.

6. The valve train assembly of claim 5, wherein the brake plunger assembly includes a check ball assembly and a first plunger body movable relative to a second plunger body, the first and second plunger bodies defining a chamber therebetween configured to receive a supply of fluid, the check ball assembly disposed in the chamber between the first and second plunger bodies.

7. The valve train assembly of claim 1, further comprising a valve shoe rotatably coupled to the lever, the valve shoe configured to engage the first exhaust valve, wherein the valve shoe is rotatably coupled to the lever by a valve shoe pin extending through the lever.

8. The valve train assembly of claim 1, wherein the first aperture defines an inner perimeter, and the lever defines an outer perimeter that fits within the inner perimeter.

9. The valve train assembly of claim 1, wherein the lever is disposed within the valve bridge main body.

10. The valve train assembly of claim 1, wherein the lever is rotatably coupled to an inner wall of the valve bridge main body, the inner wall defining the first aperture.

11. The valve train assembly of claim 1, further comprising a valve shoe pin extending through the second opposed openings and a valve shoe to rotatably couple the valve shoe to the lever.

12. The valve train assembly of claim 1, further comprising a stop flange extending outward from the lever, the stop flange configured to selectively engage a bar of the valve bridge main body to limit downward movement of the lever.

13. The valve train assembly of claim 1, wherein the engine brake rocker arm assembly includes a brake plunger assembly having a socket, wherein the socket is coupled to the lever to maintain constant contact therewith for dynamic stability.

14. The valve train assembly of claim 1, wherein the first aperture is formed through an upper surface of the main body, and the lever is rotatably coupled to side surfaces of the main body.

15. The valve train assembly of claim 14, wherein the exhaust rocker arm assembly selectively engages the upper surface to open the first and second exhaust valves.

16. The valve train assembly of claim 1, wherein the first aperture is defined by a first pair of opposed internal walls of the main body, and a second pair of opposed internal walls of the main body.

17. A valve train assembly associated with first and second exhaust valves, the assembly comprising:
a valve bridge including a main body and a lever rotatably coupled to the main body, the main body configured to engage the first and second exhaust valves, and the lever configured to engage the first exhaust valve; and
a combined exhaust and engine brake rocker arm assembly comprising:
a rocker arm body;
an exhaust rocker arm assembly formed in the rocker arm body; and
an engine brake rocker arm assembly formed in the rocker arm body and configured to operate in a collapse mode and a rigid mode,
wherein the exhaust rocker arm assembly is configured to selectively engage the valve bridge main body to open the first and second exhaust valves,
wherein the engine brake rocker arm assembly is configured to selectively engage the valve bridge lever to open only the first exhaust valve,
wherein the lever is coupled to the main body such that rotation of the lever and engagement of the first exhaust valve occurs without rotation of the main body,
wherein the main body includes an aperture, the lever at least partially disposed within the aperture,
wherein the lever is rotatably coupled to the main body by a bridge pin extending through the main body,
wherein the engine brake rocker arm assembly comprises a brake capsule assembly disposed in a bore formed in the rocker arm,
wherein the bore comprises a first bore and a second bore formed in the rocker arm, the brake capsule assembly comprising a brake plunger assembly disposed in the first bore, and an actuator assembly disposed in the second bore,
wherein the brake plunger assembly includes a check ball assembly and a first plunger body movable relative to a second plunger body, the first and second plunger bodies defining a chamber therebetween configured to receive a supply of fluid, the check ball assembly disposed in the chamber between the first and second plunger bodies,
wherein the actuator assembly comprises a pin disposed in a retainer, the pin operably associated with the check ball assembly, wherein the second bore is configured to receive a supply of fluid such that the retainer is translated upwardly within the bore to draw the pin away from contact with the check ball assembly and wherein the first plunger body is received by a socket coupled to the valve bridge lever.

\* \* \* \* \*